US 6,557,705 B1

(12) United States Patent
Nakajo et al.

(10) Patent No.: US 6,557,705 B1
(45) Date of Patent: May 6, 2003

(54) RADIATION CASSETTE

(75) Inventors: Masakazu Nakajo, Minamiashigara (JP); Seiji Ichiju, Yokohama (JP); Kimio Oosumi, Odawara (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/650,699

(22) Filed: Aug. 29, 2000

(30) Foreign Application Priority Data

Aug. 31, 1999 (JP) .......................... 11-245458
Aug. 31, 1999 (JP) .......................... 11-245471

(51) Int. Cl.[7] .............................................. G03B 42/04
(52) U.S. Cl. ...................................... 206/455; 378/188
(58) Field of Search ......................... 206/449, 455, 206/456, 804; 378/182, 188; 414/411, 416, 417

(56) References Cited

U.S. PATENT DOCUMENTS 4,350,248 A * 9/1982 Bauer ........................ 206/455
4,889,233 A   12/1989 Torii ......................... 206/455
4,912,740 A *  3/1990 Liese, Jr. .................... 206/455
5,944,306 A *  8/1999 Maeda et al. ................ 206/455
6,068,439 A *  5/2000 Ohta ......................... 206/455

FOREIGN PATENT DOCUMENTS

JP        6-90424     11/1994   .......... G03B/42/04
JP        7-36131      2/1995   .......... G03B/42/04
WO    WO 94/15854      7/1994

OTHER PUBLICATIONS

Patent Abstract of Japan 63103230 Jul. 5, 1988.
Patent Abstract of Japan 07036131 Jul. 2, 1995.

* cited by examiner

*Primary Examiner*—Jim Foster
(74) *Attorney, Agent, or Firm*—Sughrue Mion, PLLC

(57) ABSTRACT

A radiation cassette comprises a casing which accommodates an accumulative fluorescent material sheet, a lid which is installed to a part of the casing so that the lid is openable and closable, a shield plate which is arranged for the casing and which is swingably provided with the lid at a first end, a support means which swingably supports the shield plate with respect to the casing, and a lock means which fixes the shield plate to the casing and which moves back and forth in accordance with an external force so that the shield plate may be released from fixation. Accordingly, it is possible to attach and detach the shield plate arranged for the casing by means of a simple operation.

22 Claims, 18 Drawing Sheets

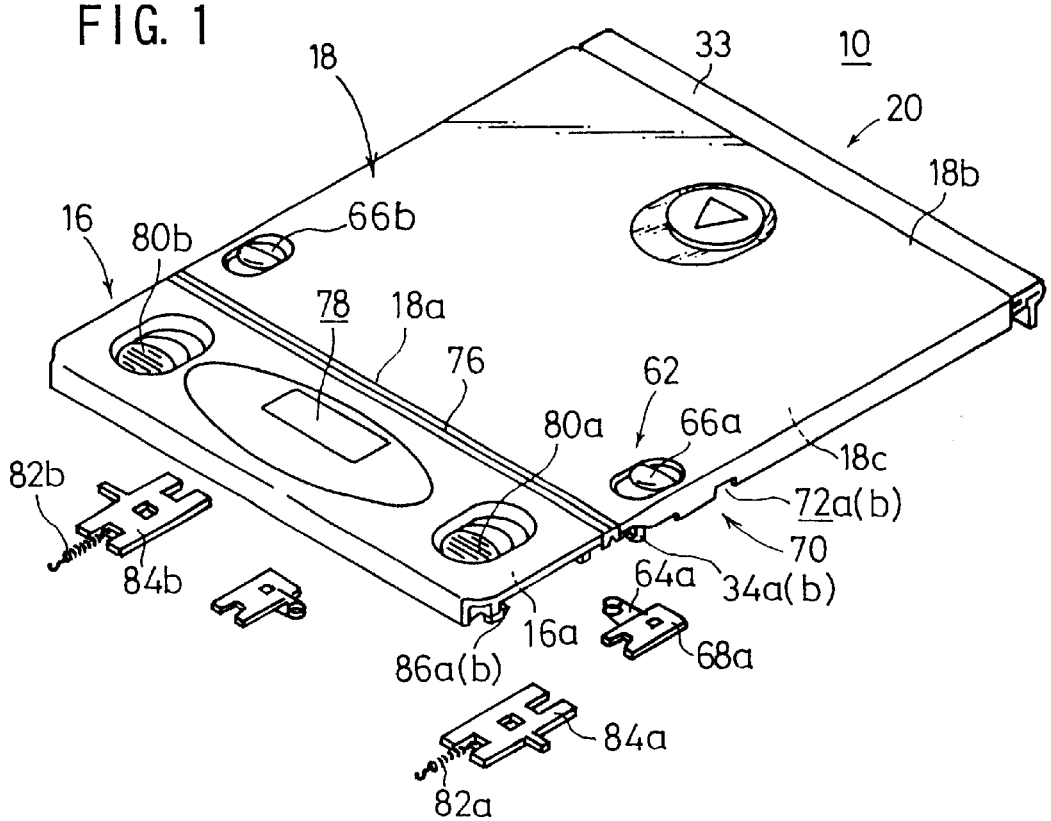
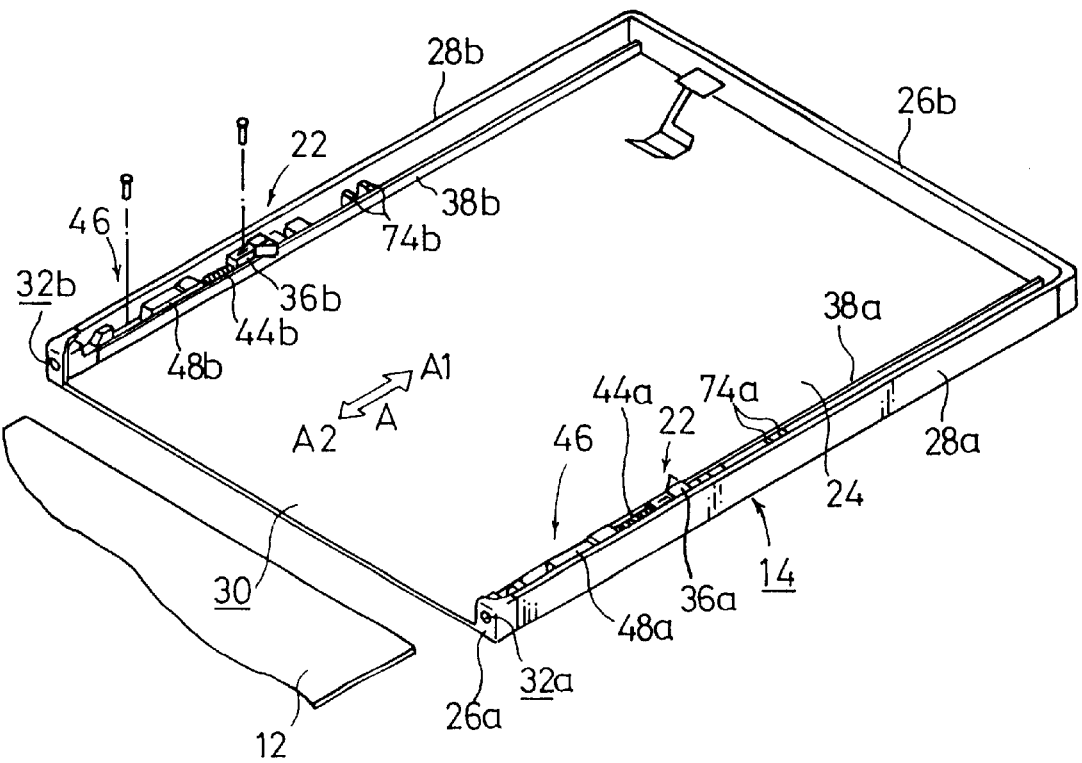
FIG. 1

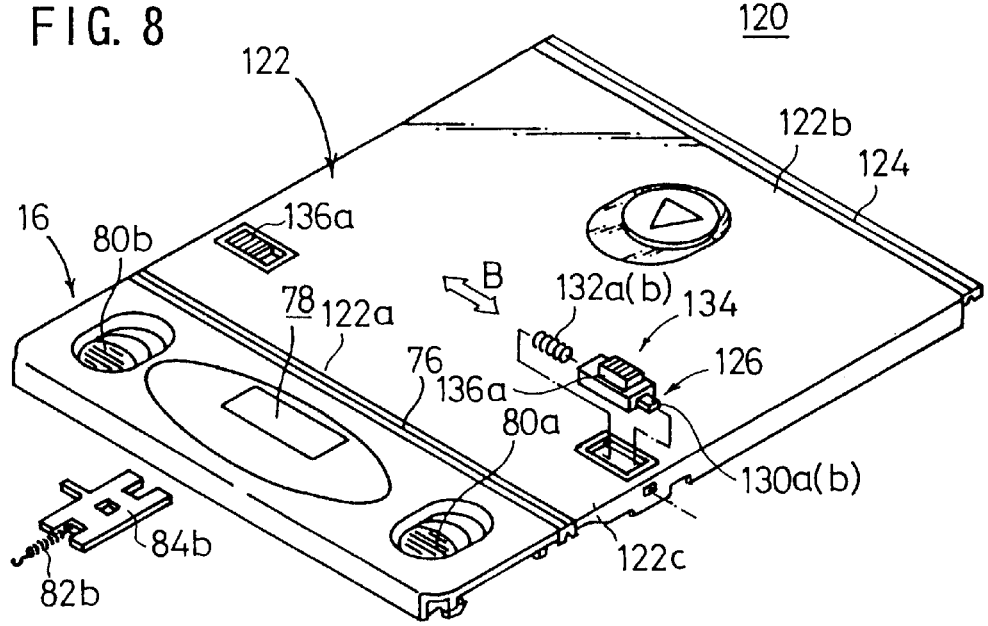
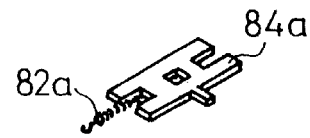
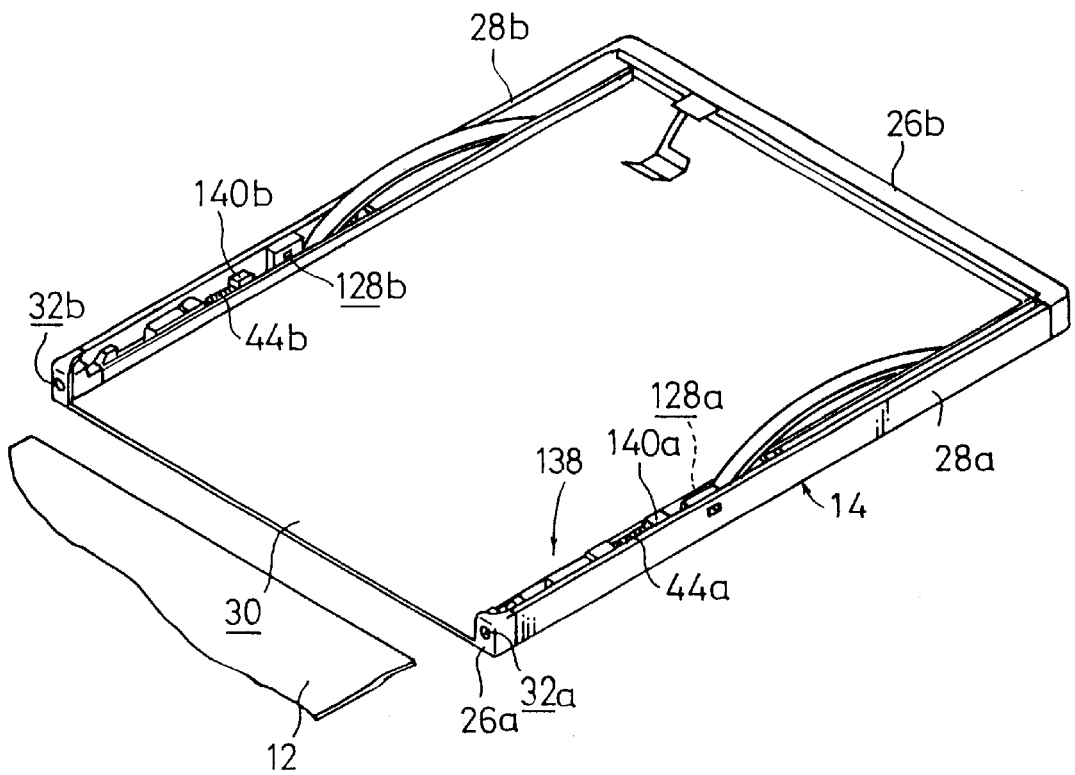
FIG. 8

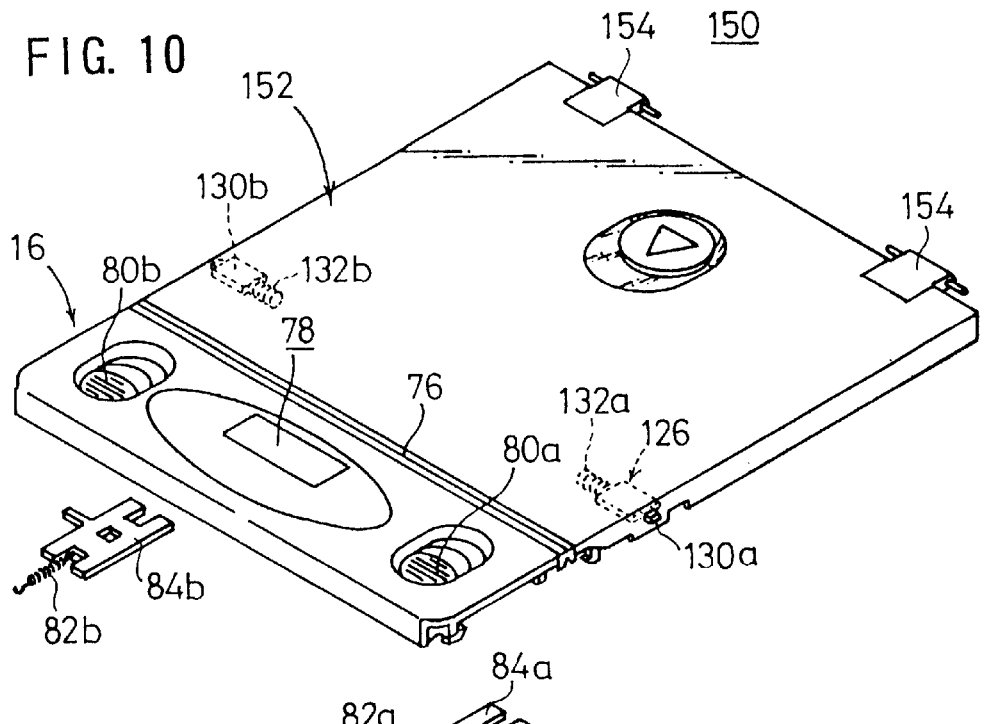
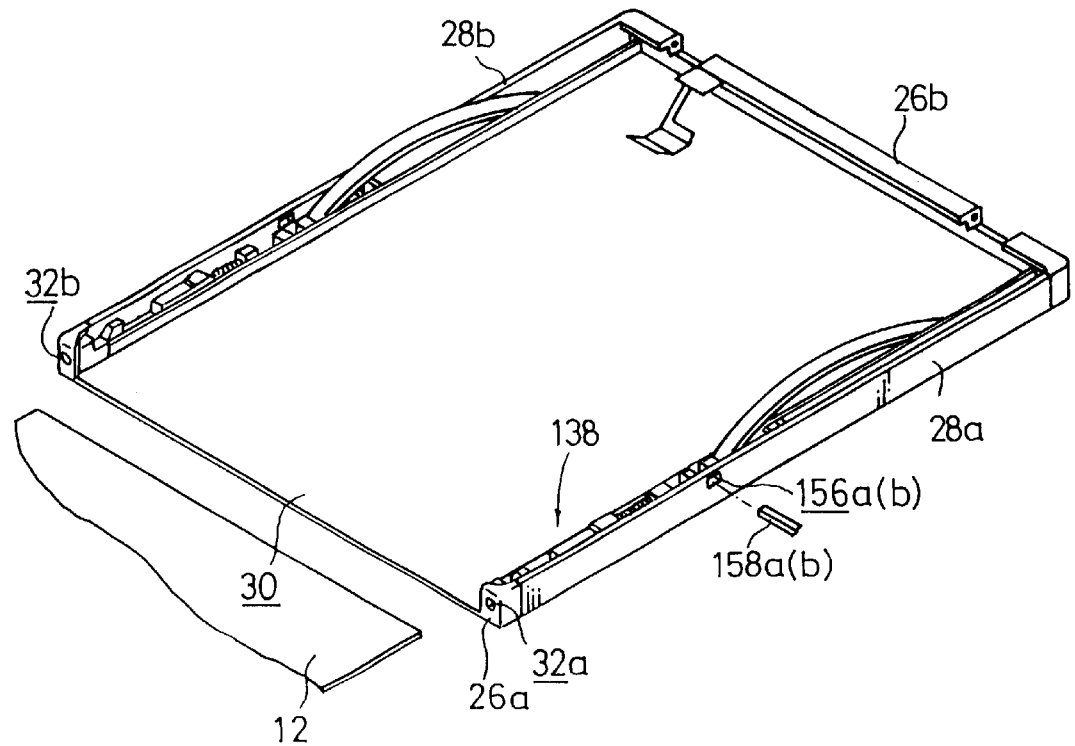
FIG. 10

RADIATION CASSETTE

BACKGROUND OF THE INVENTION

1. Field of the Invention

The present invention relates to a radiation cassette provided with a lid which is installed to a part of a casing for accommodating a radiation image record carrier so that the lid is openable and closable.

2. Description of the Related Art

For example, a system is known, in which an accumulative fluorescent material (stimulus fluorescent material) is utilized to once record radiation image information of an object such as a human body so that the radiation image information is reproduced, for example, on a photographic photosensitive material such as a photographic film, or the information is outputted as a visible image to CRT or the like.

The accumulative fluorescent material is a fluorescent material which accumulates a part of energy of a radioactive ray in accordance with radiation of the radioactive ray (for example, X-rays, α-rays, γ-rays, electron beams, ultraviolet radiation) and which exhibits stimulus light emission corresponding to the accumulated energy by being irradiated with an excitation light beam such as visible light thereafter. Usually, the accumulative fluorescent material is constructed to have a sheet-shaped configuration, and it is used as an accumulative fluorescent material sheet.

On the other hand, an operation is performed, in which a radioactive ray such as X-rays is radiated onto a object such as a human body so that radiation image information of the object is directly recorded on a photographic film. A visible image is obtained by applying a development treatment to the photographic film, and the visible image is used to perform, for example, the medical diagnosis.

Usually, the radiation image record carrier such as the accumulative fluorescent material sheet and the photographic film as described above is charged to a photographing apparatus in a state in which the radiation image record carrier is accommodated one by one in a cassette. The radiation image record carrier is irradiated with the X-rays through the cassette.

Those known as such a cassette include, for example, a cassette disclosed in Japanese Patent Publication No. 6-90424 or Japanese Laid-Open Patent Publication No. 7-36131. As shown in FIG. 17, the cassette described above comprises a casing 2 which accommodates a radiation image record carrier 1, a lid 3 which is installed to a part of the casing 2 to be openable and closable, and a shield plate 4 which is arranged for a residual portion of the casing 2 and which holds the radiation image record carrier 1 in a light-shielding manner together with the lid 3.

If any dust or the like exists at the inside of the cassette, the dust or the like may adhere to the radiation image record carrier 1. It is feared that a defective image is recorded on the radiation image record carrier 1 by being irradiated with the radioactive ray. For this reason, when a high quality image is required especially in the case of the use of a mammocassette, it is necessary to frequently clean the interior of the cassette.

However, in the case of the cassette described above, the shield plate 4 is usually fixed to the casing 2 by the aid of a plurality of screws. It is considerably complicated to perform the operation for detaching the shield plate 4. Therefore, a problem is pointed out such that it takes a considerable period of time to perform the operation for cleaning the interior of the cassette.

Usually, it is necessary to provide a lead sheet in the cassette corresponding to a back surface side (side of the surface opposite to the surface irradiated with the radioactive ray) of the radiation image record carrier 1. As shown in FIG. 18, lead sheets 5a, 5b are also arranged for the cassette described above. That is, the lid 3 is constructed to be openable and closable with a hinge section 6. In order to avoid the occurrence of any damage caused by bending or folding of the lead sheet, the arrangement is made in a divided manner with the lead sheet 5a which is secured to the back surface of the shield plate 4 to extend in the casing 2 and the lead sheet 5b which is secured to the back surface of the lid 3.

However, in the case of the cassette described above, a wrap section 7, at which the lead sheets 5a, 5b are overlapped with each other, exists in the cassette, because the divided lead sheets 5a, 5b are used. Therefore, the thickness of lead differs between the wrap section 7 and the other sections. A problem is pointed out such that any nonuniformity of an image due to scattered rays is generated on a radiation image recorded on the radiation image record carrier 1.

SUMMARY OF THE INVENTION

A general object of the present invention is to provide a radiation cassette which makes it possible to efficiently clean the interior of the radiation cassette having a lid which is installed to a part of a casing to be openable and closable, by means of simple operation.

A principal object of the present invention is to provide a radiation cassette which makes it possible to reliably avoid, with a simple arrangement, the occurrence of nonuniformity of an image on a radiation image record carrier in the cassette.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 shows an exploded perspective view illustrating a radiation cassette according to a first embodiment of the present invention;

FIG. 8 shows an exploded perspective view illustrating a radiation cassette according to a third embodiment of the present invention;

FIG. 10 shows an exploded perspective view illustrating a radiation cassette according to a fourth embodiment of the present invention;

DESCRIPTION OF THE PREFERRED EMBODIMENTS

Figure 2:
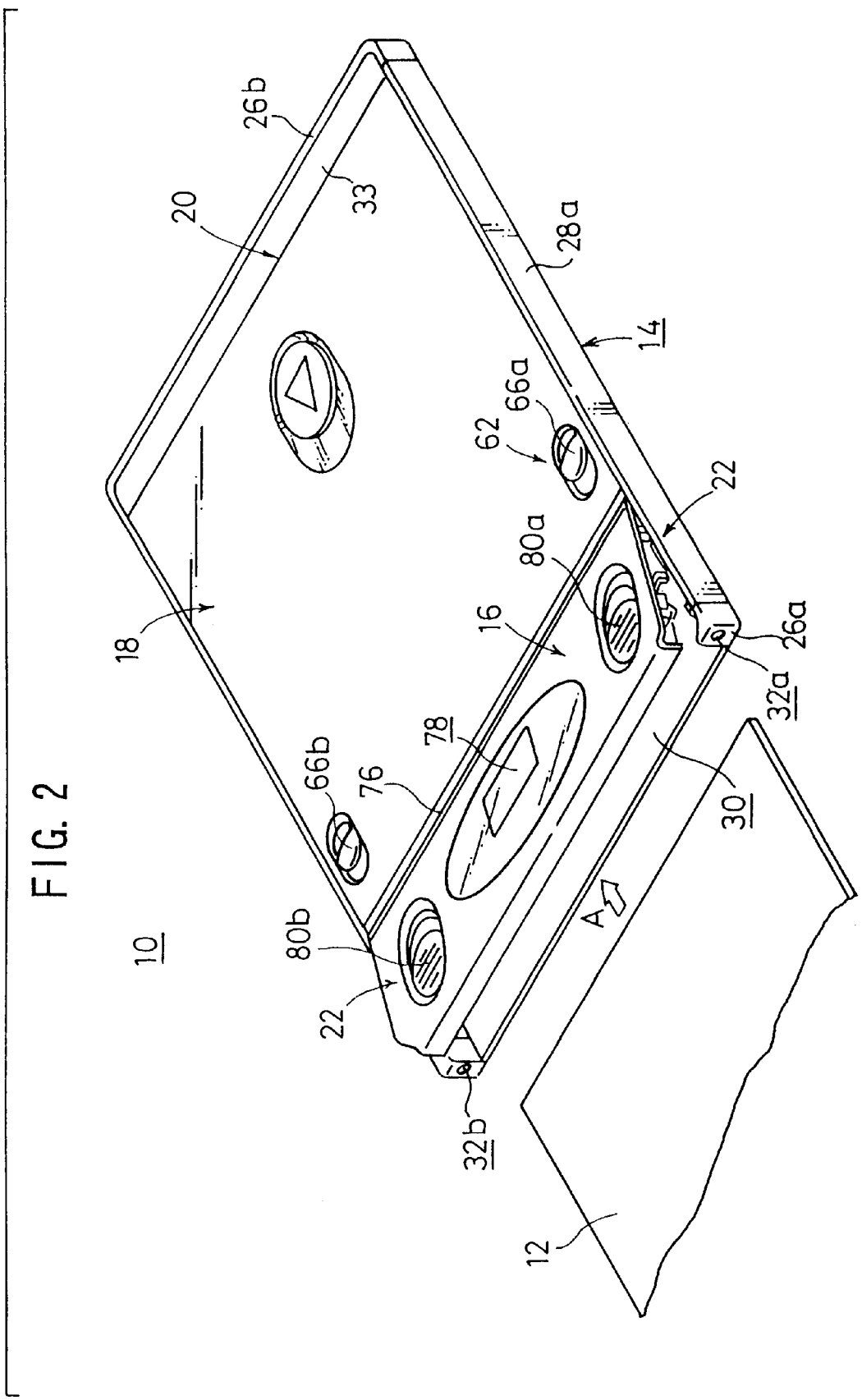
FIG. 2 shows a perspective view depicting the radiation cassette.

FIG. 1 shows an exploded perspective view illustrating a radiation cassette 10 according to a first embodiment of the present invention, and FIG. 2 shows a perspective view depicting the radiation cassette 10.

The radiation cassette 10 comprises a casing 14 which accommodates an accumulative fluorescent material sheet (radiation image record carrier) 12, a lid 16 which is installed to a part of the casing 14 so that the lid 16 is openable and closable, a shield plate 18 which is arranged for a residual portion of the casing 14 and which is swingably provided with the lid 16 at a first end 18a, a support means 20 which detachably supports a second end 18b of the shield plate 18 with respect to the casing 14, and a lock means 22 which fixes the shield plate 18 on the first end 18a to the casing 14 and which moves back and forth in accordance with an external force so that the shield plate 18 may be released from fixation.

The casing 14 includes a bottom wall section 24, end wall sections 26a, 26b which are provided on the upstream side and on the downstream side in the inserting direction of the accumulative fluorescent material sheet 12 (direction of the arrow A), and side wall sections 28a, 28b which extend in the inserting direction. An opening 30, which is used to insert and withdraw the accumulative fluorescent material sheet 12, is formed at the end wall section 26a. Pressing pin-inserting holes 32a, 32b, which are used to release a lid lock means 46 as described later on, are formed on both sides of the opening 30 to penetrate through the end wall section 26a.

The shield plate 18 closes the upper portion of the casing 14, and it is detachably installed to the casing 14 by the aid of a hinge 33 which constructs the support means 20. Upper hooks 34a, 34b, which are disposed at both end edge portions in the widthwise direction to expand downwardly, are formed on a back surface 18c of the shield plate 18. Lower hooks 36a, 36b, which construct the lock means 22 and which are engageable with the upper hooks 34a, 34b, are provided on the casing 14.

Figure 3:
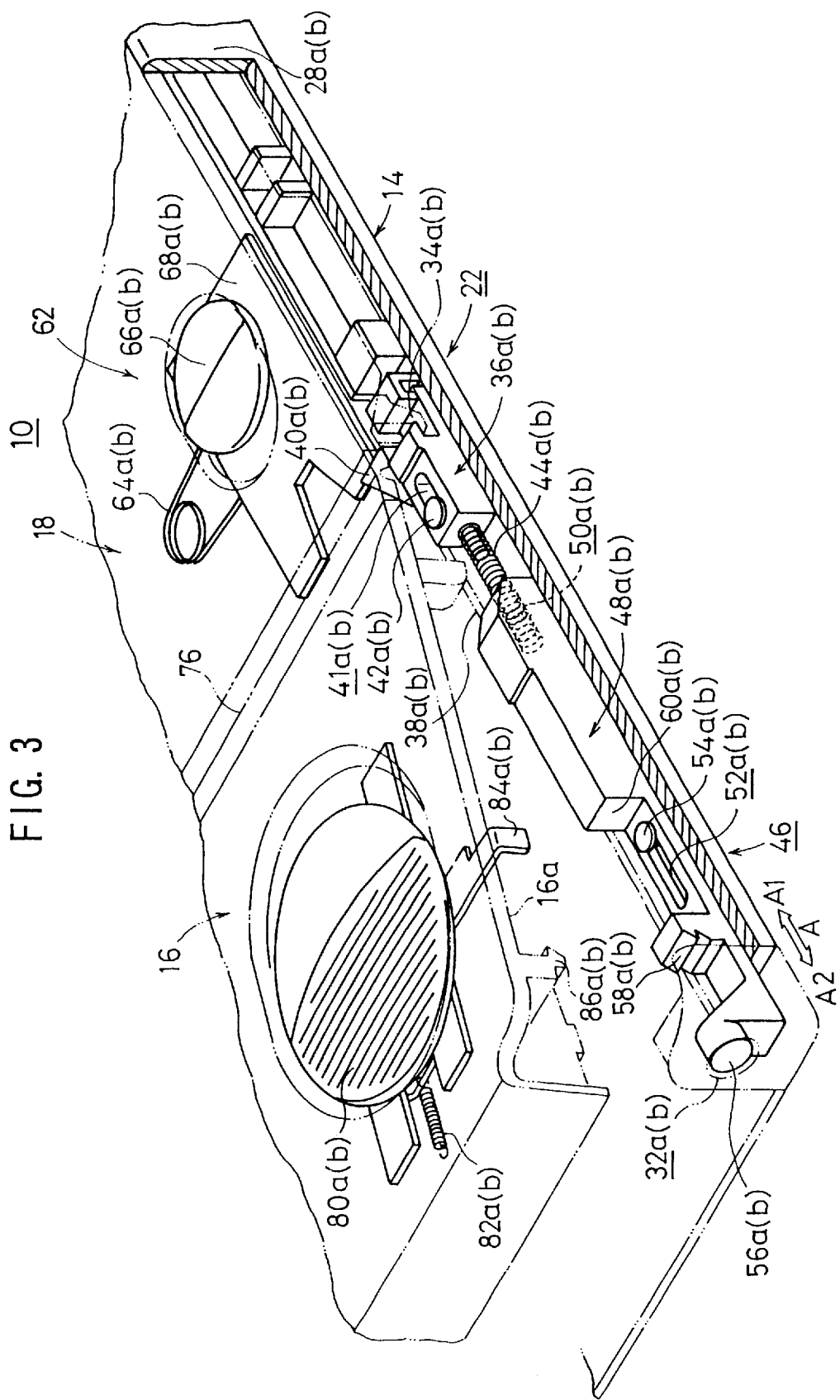
FIG. 3 shows a perspective view illustrating a lock means for constructing the radiation cassette.
Figure 4:
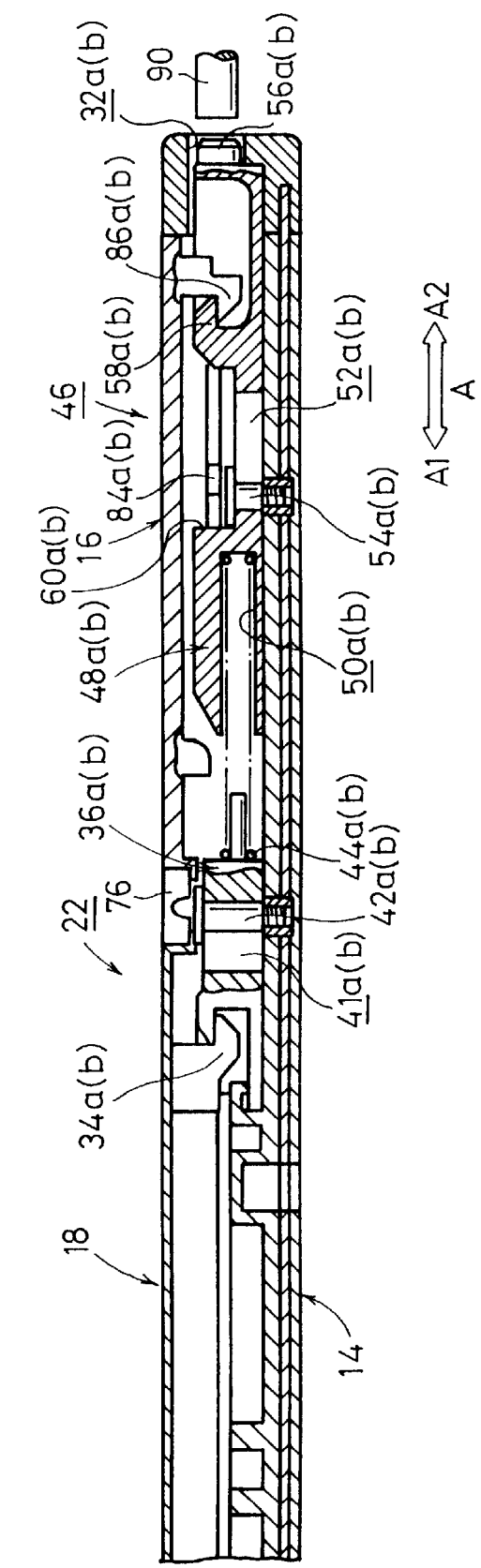
FIG. 4 shows a longitudinal sectional view illustrating the lock means.

As shown in FIGS. 3 and 4, the lower hook 36a, 36b is arranged between a guide plate 38a, 38b and the inner side of the side wall section 28a, 28b of the casing 14. Each of the lower hooks 36a, 36b includes an expanded section 40a, 40b which protrudes inwardly. An oblong circular through-hole 41a, 41b, which is lengthy in the direction of the arrow A, is provided for the lower hook 36a, 36b. A first fastener 42a, 42b is inserted into the through-hole 41a, 41b so that the first fastener 42a, 42b is screwed into the casing 14. Accordingly, the lower hook 36a, 36b is supported movably back and forth by a predetermined distance in the direction of the arrow A.

A first end of a spring 44a, 44b is engaged with the lower hook 36a, 36b. A second end of the spring 44a, 44b is inserted into a hole 50a, 50b formed in a slider 48a, 48b which constructs a lid lock means 46. An oblong circular through-hole 52a, 52b, which is lengthy in the direction of the arrow A, is formed through the slider 48a, 48b. A second fastener 54a, 54b, which is inserted into the through-hole 52a, 52b, is screwed into the casing 14.

Accordingly, the slider 48a, 48b is supported movably back and forth by a predetermined distance in the direction of the arrow A.

A columnar pin abutment section 56a, 56b, which is insertable into the hole 32a, 32b of the casing 14, is provided at the forward end of the slider 48a, 48b. A lower lock pawl 58a, 58b is formed to expand at a position separated rearwardly (in the direction of the arrow A1) by a predetermined distance from the pin abutment section 56a, 56b. A pressing section 60a, 60b, which rises upwardly, is formed to expand at a position separated rearwardly from the lower lock pawl 58a, 58b of the slider 48a, 48b.

The shield plate 18 is provided with a lock release means 62 which is disposed at a position deviated toward the first end 18a and which makes it possible to release the fixation of the shield plate 18 effected by the lock means 22 in a one-touch manner. As shown in FIGS. 1 and 3, the lock release means 62 includes a lock release knob 66a, 66b which is energized rearwardly (in the direction of the arrow A1) by the aid of a spring 64a, 64b. The knobs 66a, 66b are arranged movably back and forth at both side portions deviated toward the first end 18a of the shield plate 18. A lever 68a, 68b is provided at a lower portion of the knob 66a, 66b. Forward ends of the levers 68a, 68b are engageable with the expanded sections 40a, 40b of the lower hooks 36a, 36b protruding inwardly respectively.

A positioning means 70, which is used to position and hold the shield plate 18 with respect to the casing 14, is provided for the shield plate 18 and the casing 14. As shown in FIG. 1, the positioning means 70 includes cutouts 72a, 72b which are provided on both side portions of the shield plate 18, and stopper sections 74a, 74b which are provided at the inside of the side wall sections 28a, 28b of the casing 14 and which are insertable into the cutouts 72a, 72b.

The lid 16 is provided in an integrated manner at the first end 18a of the shield plate 18 with a hinge 76 intervening therebetween. The lid 16 is installed to the casing 14 so that the lid 16 is openable and closable. A bar code-reading window 78 is formed on the lid 16. Lock release knobs 80a, 80b, which construct the lid lock means 46, are disposed on both sides of the window 78, and they are pressed frontwardly (in the direction of the arrow A2) by the aid of springs 82a, 82b.

As shown in FIG. 3, a lock release plate 84a, 84b, which is inserted between the pressing section 60a, 60b of the slider 48a, 48b and the lower lock pawl 58a, 58b, is provided at a lower portion of the knob 80a, 80b. An upper lock pawl 86a, 86b, which is engageable with the lower lock pawl 58a, 58b of the slider 48a, 48b, is formed on the back surface 16a of the lid 16.

The operation of the radiation cassette 10 constructed as described above will be explained below.

When the accumulative fluorescent material sheet 12 is inserted into the radiation cassette 10 before the radiation image information is recorded, the lid lock means 46 is released by directly operating the knobs 80a, 80b for constructing the lid lock means 46 provided on the lid 16 by an operator, or by inserting lock release pins 90 into the holes 32a, 32b of the casing 14 as shown in FIG. 4 in an unillustrated charging apparatus.

Specifically, when the knobs 80a, 80b are pressed in the direction of the arrow A1 as shown in FIG. 3, the lock release plates 84a, 84b are moved in the direction of the arrow A1 integrally with the knobs 80a, 80b against the resilient force of the springs 82a, 82b. Accordingly, the lock release plates 84a, 84b press, in the direction of the arrow A1, the pressing sections 60a, 60b which construct the sliders 48a, 48b. The sliders 48a, 48b are moved in the direction of the arrow A1 against the springs 44a, 44b. Therefore, the lower lock pawls 58a, 58b are disengaged from the upper lock pawls 86a, 86b, and the lid lock means 46 is released. Thus, the lid 16 is openable with respect to the casing 14.

On the other hand, as shown in FIG. 4, in the case of the automatic lock release by using the lock release pins 90, the lock release pins 90 are inserted into the holes 32a, 32b to press the pin abutment sections 56a, 56b of the sliders 48a, 48b in the direction of the arrow A1. Accordingly, the sliders 48a, 48b are moved in the direction of the arrow A1 against the springs 44a, 44b. The lower lock pawls 58a, 58b are disengaged from the upper lock pawls 86a, 86b, giving a state in which the lid 16 is openable.

Subsequently, when the lid 16 is opened by being rotated about the point of support of the hinge 76 with respect to the casing 14, the opening 30 of the casing 14 is open. The accumulative fluorescent material sheet 12 is inserted into the casing 14 via the opening 30. When the lid 16 is pressed toward the casing 14, the upper lock pawls 86a, 86b, which are provided on the back surface 16a of the lid 16, abut against the lower lock pawls 58a, 58b which are provided on the sliders 48a, 48b. Accordingly, the lower lock pawls 58a, 58b are pressed in the direction of the arrow A1.

Accordingly, the sliders 48a, 48b are once moved in the direction of the arrow A1, and then they are moved in the direction of the arrow A2 by the aid of the springs 44a, 44b. The lower lock pawls 58a, 58b and the upper lock pawls 86a, 86b are engaged with each other, and thus the lid 16 is fixed to the casing 14.

The radiation cassette 10, in which the accumulative fluorescent material sheet 12 is accommodated, is charged to the unillustrated image-recording apparatus. The radioactive ray, which includes the radiation image information of the unillustrated object, is radiated from the side of the bottom wall section 24 of the radiation cassette 10. The radiation image information is recorded on the accumulative fluorescent material sheet 12.

Figure 5:
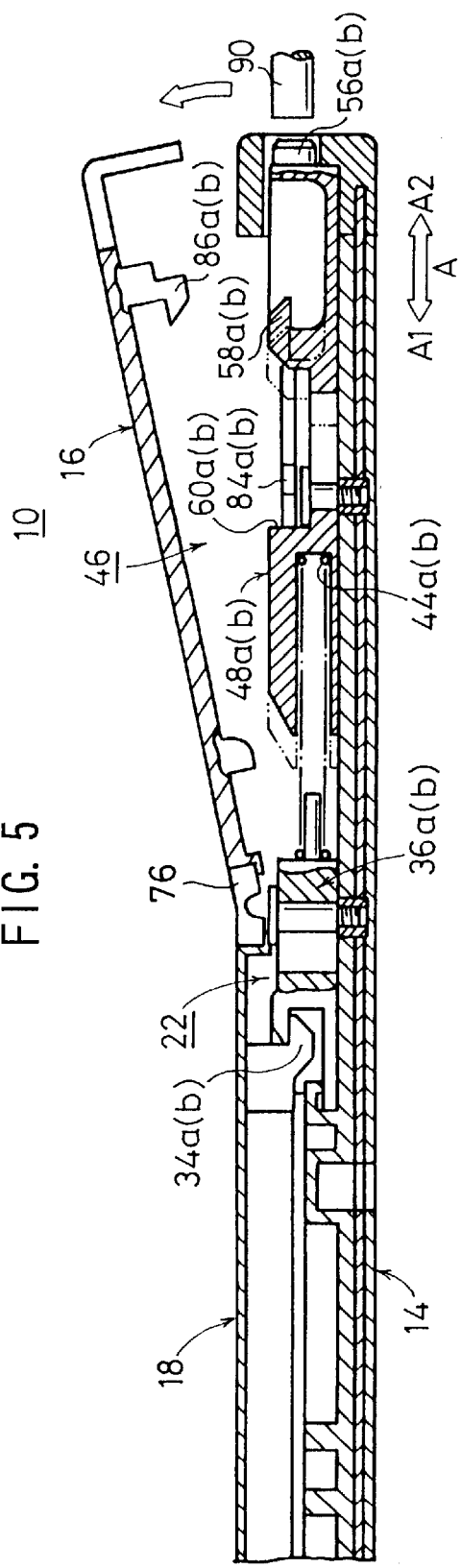
FIG. 5 illustrates the operation of a lid lock means for constructing the radiation cassette.

When the shield plate 18 and the lid 16 are removed from the casing 14 to perform, for example, the cleaning operation for the interior of the casing 14, the knobs 80a, 80b, which are provided on the lid 16, are firstly moved in the direction of the arrow A1 against the springs 82a, 82b to release the lid lock means 46 (see FIG. 5). Subsequently, as shown in FIG. 3, when the knobs 66a, 66b, which are provided on the shield plate 18, are pressed in the direction of the arrow A2 against the springs 64a, 64b, the levers 68a, 68b, which are integrally fixed to the knobs 66a, 66b, are also moved in the direction of the arrow A2.

Figure 6:
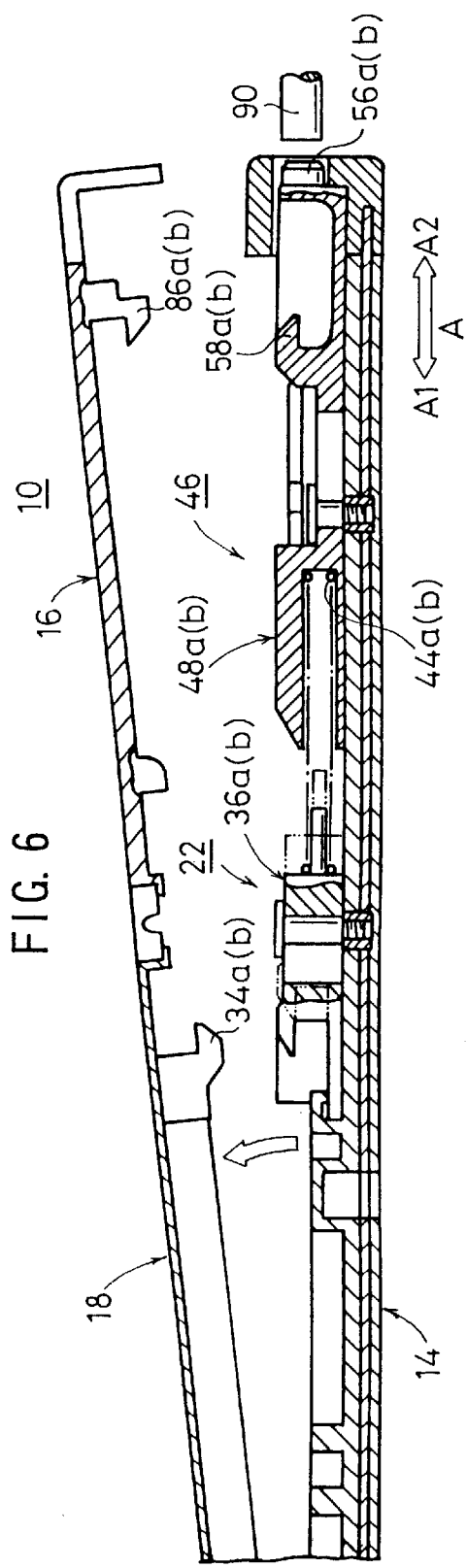
FIG. 6 illustrates the operation performed when the lock means is released.

Accordingly, the levers 68a, 68b abut against the expanded sections 40a, 40b which are provided for the lower hooks 36a, 36b for constructing the lock means 22. The lower hooks 36a, 36b are moved in the direction of the arrow A2 against the springs 44a, 44b by the aid of the expanded sections 40a, 40b. Therefore, the lower hooks 36a, 36b are disengaged from the upper hooks 34a, 34b which are provided on the shield plate 18, and thus the locked state of the shield plate 18 effected by the lock means 22 is released (see FIG. 6). In this state, when the second end 18b of the shield plate 18 is withdrawn from the hinge 33, the shield plate 18 and the lid 16 are removed from the casing 14 in an integrated manner.

On the other hand, when the shield plate 18 and the lid 16 are installed to the casing 14, then the second end 18b of the shield plate 18 is forcibly fitted into the hinge 33, and then the side of the first end 18a of the shield plate 18 is pressed toward the casing 14. Accordingly, the upper hooks 34a, 34b, which are provided on the back surface 18c of the shield plate 18, abut against the lower hooks 36a, 36b. The lower hooks 36a, 36b are once moved in the direction of the arrow A2 against the springs 44a, 44b. After that, the lower hooks 36a, 36b are moved in the direction of the arrow A1, and they are engaged with the upper hooks 34a, 34b. Further, when the lid 16 is pressed toward the casing 14, the upper lock pawls 86a, 86b and the lower lock pawls 58a, 58b are engaged with each other. Thus, the lid 16 is fixed to the casing 14.

As described above, in the first embodiment, the shield plate 18 is supported by the casing 14 with the second end 18b being inserted into the hinge 33. The lock means 22 is provided on the side of the first end 18a of the shield plate 18 and the casing 14. The lock means 22 can be one-touch released from the locked state only by operating the lock release means 62. Accordingly, an effect is obtained such that the operation for detaching the shield plate 18 from the casing 14 is performed quickly and easily all at once as compared with the conventional structure based on the screw-fastening system.

Further, the shield plate 18 can be fixed to the casing 14 by the aid of the lock means 22 only by pressing the shield plate 18 toward the casing 14. Accordingly, the following advantage is obtained. That is, the operation for attaching/detaching the shield plate is quickly performed. Even when it is necessary to frequently clean the interior of the radiation cassette 10 especially in the case of the mammocassette, the cleaning operation for the radiation cassette 10 is effectively simplified.

In the first embodiment, the positioning means 70 is provided for the casing 14 and the shield plate 18. The positioning means 70 is provided with the stopper sections 74a, 74b which are formed on the casing 14, and the cutouts 72a, 72b which are provided on the shield plate 18. When the shield plate 18 is fixed to the casing 14, the stopper sections 74a, 74b are fitted to the cutouts 72a, 72b. Accordingly, it is possible to position and hold the shield plate 18 accurately and tightly with respect to the casing 14.

In the first embodiment, the second end 18b of the shield plate 18 is detachable with respect to the hinge 33. Alternatively, the second end 18b may be constructed integrally with the hinge 33. Further alternatively, another hinge structure may be used and arranged swingably with respect to the casing 14.

Figure 7:
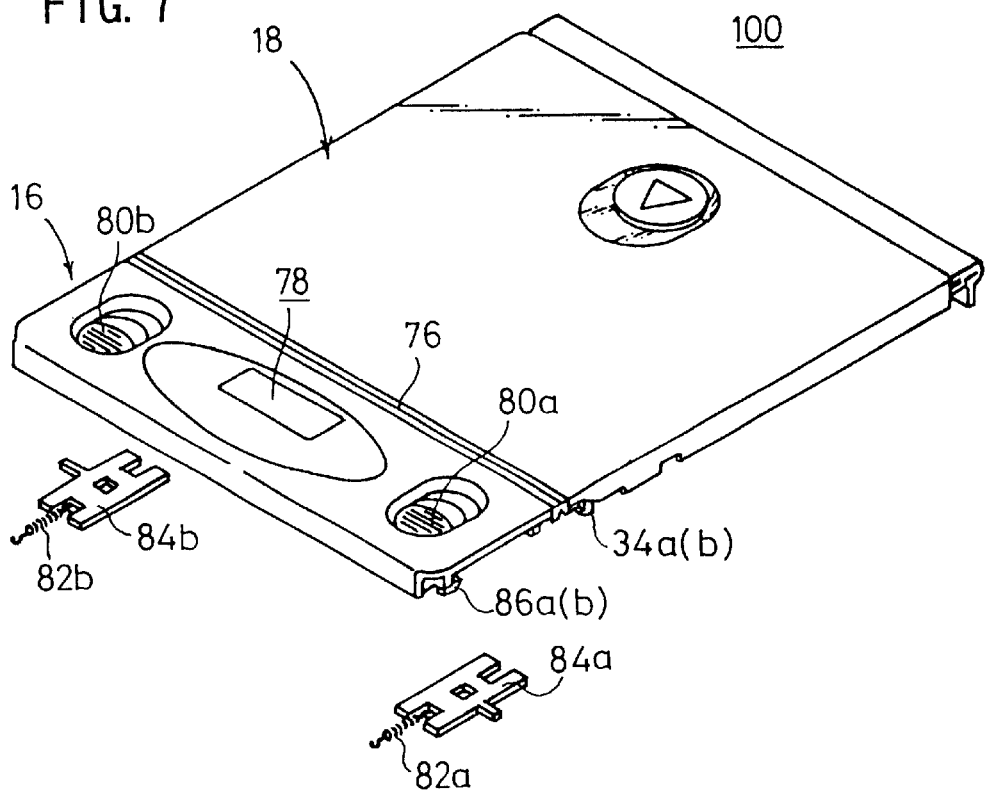
FIG. 7 shows an exploded perspective view illustrating a radiation cassette according to a second embodiment of the present invention.

FIG. 7 shows an exploded perspective view illustrating a radiation cassette 100 according to a second embodiment of the present invention. The same constitutive components as those of the radiation cassette 10 according to the first embodiment are designated by the same reference numeral, detailed explanation of which will be omitted. Explanation will be made in this way as well for radiation cassettes 120, 150 according to third and fourth embodiments described later on.

The radiation cassette 100 does not use the lock release means 62. The locked state of the shield plate 18, which is effected by the lock means 22, is released by directly moving the lower hooks 36a, 36b for constructing the lock means 22, for example, with unillustrated pins in the direction of the arrow A2.

Therefore, the radiation cassette 100 according to the second embodiment can be effectively used when it is unnecessary to perform the cleaning operation so frequently, unlike the mammocassette. Accordingly, an effect is obtained for the radiation cassette 100 according to the second embodiment such that the structure is effectively simplified as compared with the radiation cassette 10 according to the first embodiment.

Figure 9:
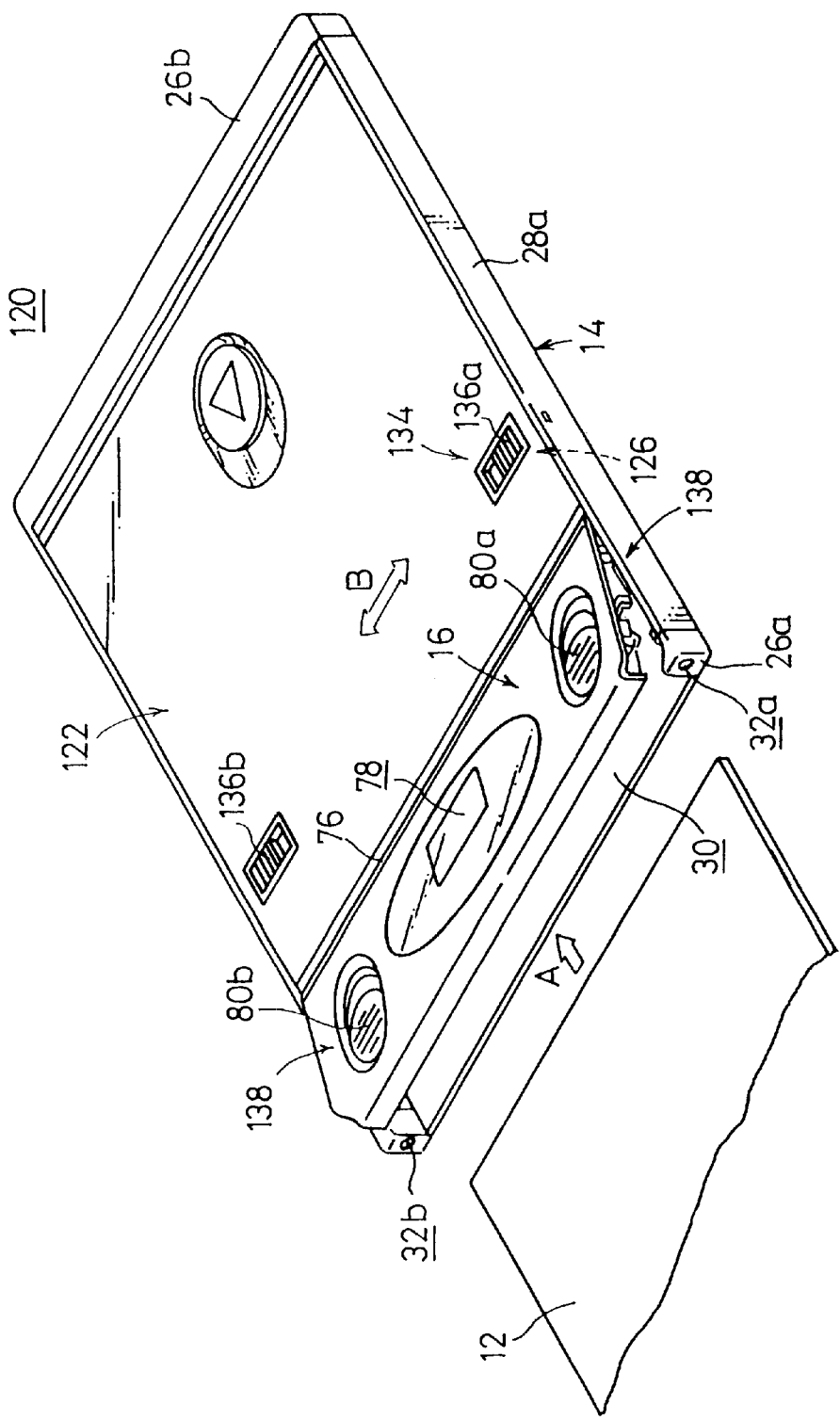
FIG. 9 shows a perspective view depicting the radiation cassette.

FIG. 8 shows an exploded perspective view illustrating a radiation cassette 120 according to a third embodiment of the present invention, and FIG. 9 shows a perspective view depicting the radiation cassette 120.

The radiation cassette 120 is provided with a shield plate 122 which is swingable with respect to the casing 14. A second end 122b of the shield plate 122 is fixed to a hinge 124. A lock means 126, which fixes the shield plate 122 to the casing 14 and which is movable back and force in accordance with an external force to make it possible to release the fixation of the shield plate 122, is provided on the side of a first end 122a of the shield plate 122.

The lock means 126 comprises recesses 128a, 128b which are formed at both side portions of the casing 14, and lock members 130a, 130b which are displaceable back and forth in the direction of the arrow B and which are engageable with the recesses 128a, 128b. The lock members 130a, 130b are disposed on the side of the back surface 122c of the shield plate 122, and they are mutually urged toward the side wall sections 28a, 28b of the casing 14 by the aid of springs 132a, 132b.

Slide knobs 136a, 136b for constructing the lock release means 134 are secured to the lock members 130a, 130b. The slide knobs 136a, 136b are arranged on the surface side of the shield plate 122. A lid lock means 138 for fixing the lid 16 to the casing 14 comprises support members 140a, 140b which are fixed to the casing 14 to fasten the ends of the springs 44a, 44b.

The radiation cassette 120 constructed as described above is operated as follows. That is, when the shield plate 122 is opened with respect to the casing 14, the slide knobs 136a, 136b, which construct the lock release means 134, are pressed in directions to make approach to one another, in a state in which the lock of the lid 16 effected by the lid lock means 138 is released. Accordingly, the lock members 130a, 130b, which are integrally provided for the slide knobs 136a, 136b, are disengaged from the recesses 128a, 128b which are formed on the side wall sections 28a, 28b for constructing the casing 14. Therefore, the locked state of the shield plate 122 effected by the lock means 126 is released, and thus the shield plate 122 is swingable about the point of support of the hinge 124.

Subsequently, for example, after the cleaning operation is performed for the interior of the casing 14, the shield plate 122 is moved to make closure toward the casing 14. During this process, the lock members 130a, 130b, which construct the lock means 126, abut against the side wall sections 28a, 28b of the casing 14 to cause displacement in directions to make approach to one another, and then they protrude toward the recesses 128a, 128b to fix the shield plate 122 to the casing 14. Further, when the lid 16 is moved to make closure toward the casing 14, the lid 16 is locked by the casing 14 by the aid of the lid lock means 138.

Alternatively, the following operation is also available. An operator forcibly holds the slide knobs 136a, 136b for constructing the lock release means 134 in directions to make approach to one another. When the shield plate 122 is closed toward the casing 14, the pressing force, which is exerted on the slide knobs 136a, 136b, is released in a state in which the shield plate 122 is closed on the casing 14. Thus, the locking operation effected by the lock means 126 is performed.

In the radiation cassette 120 according to the third embodiment constructed as described above, the locked state effected by the lock means 126 is released in a one-touch manner only by operating the lock release means 134, in the same manner as in the radiation cassette 10 according to the first embodiment. Therefore, an effect is obtained such that the shield plate 122 is allowed to make the swinging movement quickly with respect to the casing 14, and it is possible to perform, for example, the cleaning operation for the radiation cassette 120 efficiently with ease.

FIG. 10 shows an exploded perspective view illustrating a radiation cassette 150 according to a fourth embodiment of the present invention.

The radiation cassette 150 is constructed in approximately the same manner as the radiation cassette 120 according to the third embodiment. A shield plate 152 is swingably supported by the casing 14 by the aid of a hinge 154. A lock means 126 is provided for the shield plate 152 and the casing 14. No lock release means is provided for the shield plate 152. Lock release holes 156a, 156b, which are used to inwardly press the lock members 130a, 130b respectively, are formed at the side surface sections 28a, 28b which construct the casing 14. Lock release pins 158a, 158b are insertable into the lock release holes 156a, 156b. The lid 16, which is swingably attached to the shield plate 152, is capable of being fixed to the casing 14 by the aid of the lid lock means 138.

In the radiation cassette 150 constructed as described above, the lock release means is not provided for the shield plate 152. An advantage is obtained such that the arrangement is effectively simplified. When the shield plate 152 is allowed to make swinging movement from the casing 14, for example, the lock release pins 158a, 158b are inserted from the outside into the lock release holes 156a, 156b. The lock release pins 158a, 158b press the lock members 130a, 130b for constructing the lock means 126 in directions to make approach to one another.

Accordingly, the lock members 130a, 130b are disengaged from the recesses 128a, 128b of the side wall sections 28a, 28b. The locked state of the shield plate 152, which is effected by the lock means 126, is released. Therefore, the shield plate 152 is allowed to make the swinging movement about the point of support of the hinge 154 integrally with the lid 16 for which the lock effected by the lock means 138 is previously released. For example, the cleaning operation is performed for the interior of the casing 14.

Therefore, an effect, which is equivalent to those obtained in the first to third embodiments, is obtained in the fourth embodiment, for example, such that the operation for attaching/detaching the shield plate 152 with respect to the casing 14 is performed easily and quickly all at once.

Figure 11:
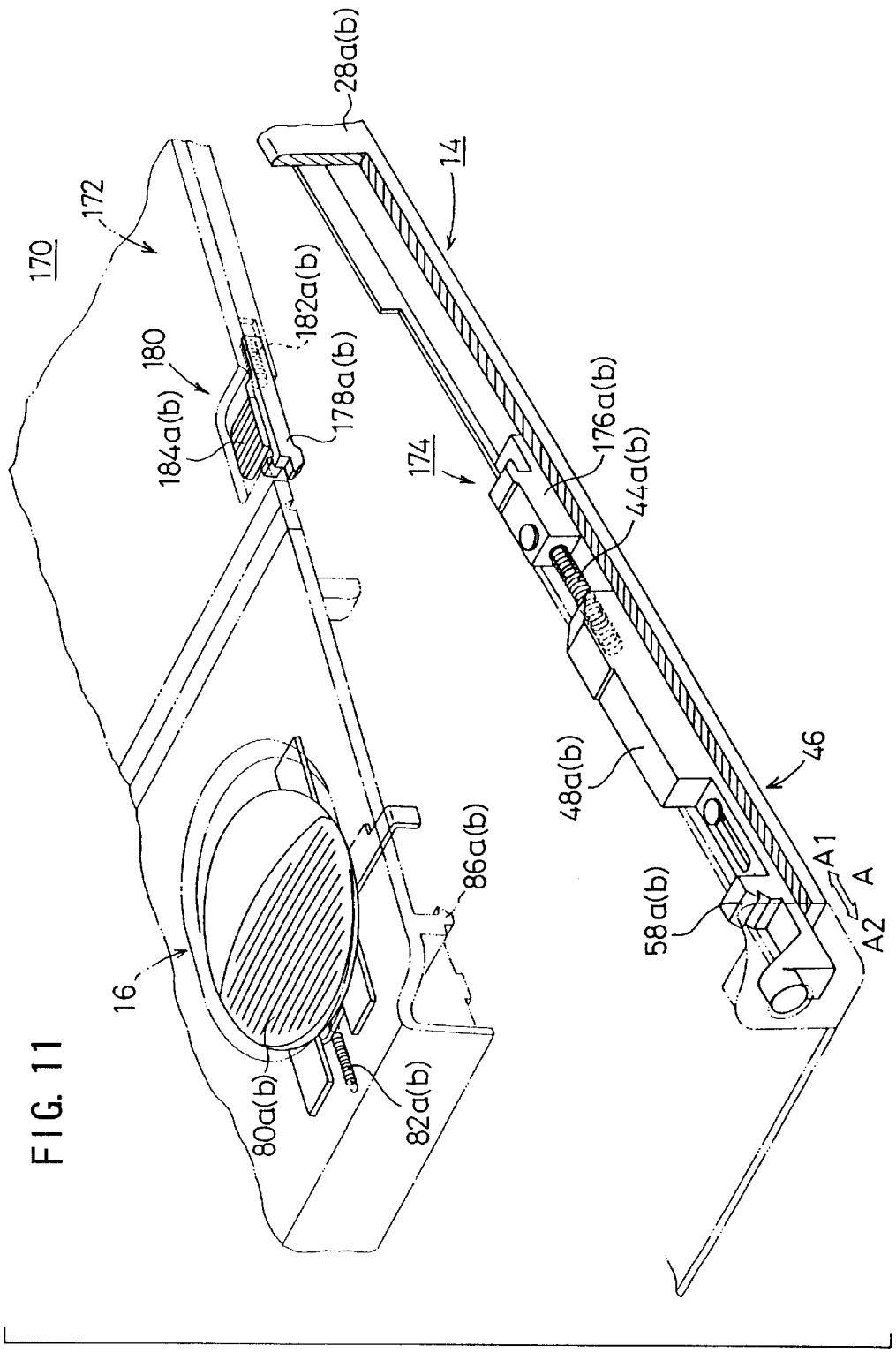
FIG. 11 shows a perspective view illustrating major components of a radiation cassette according to a fifth embodiment of the present invention.
Figure 12:
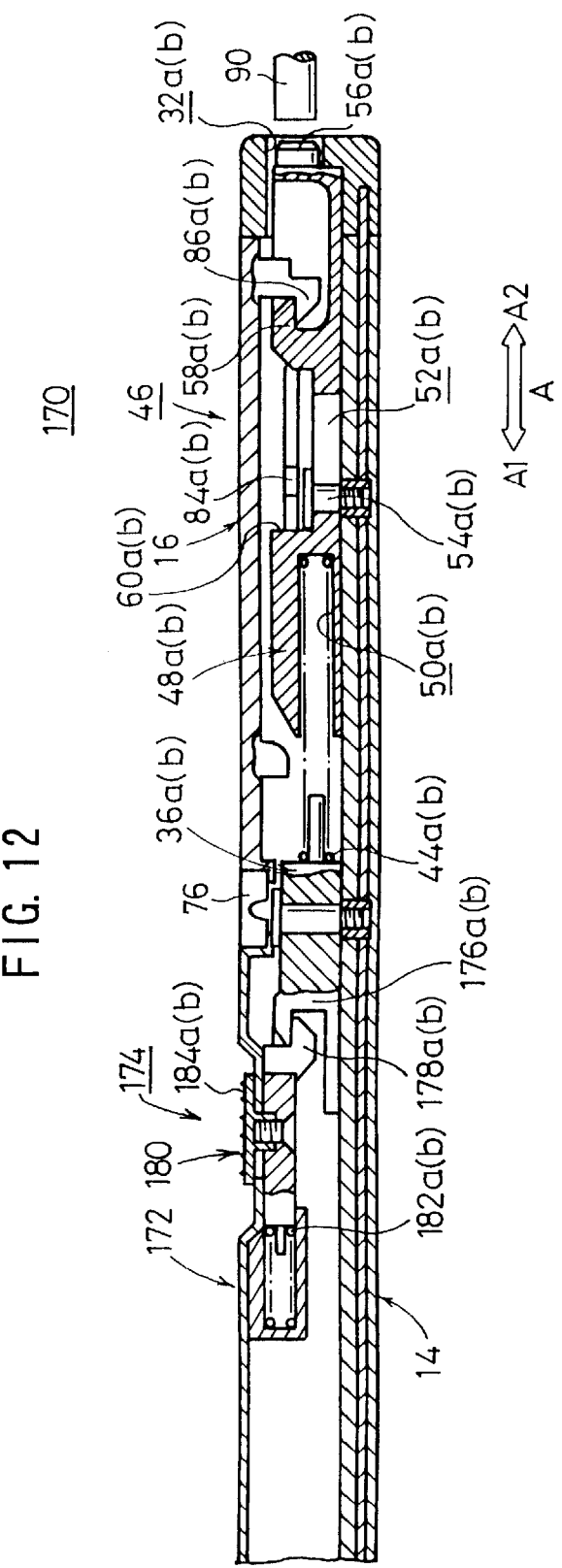
FIG. 12 shows a sectional view illustrating major components of the radiation cassette.

FIG. 11 shows a perspective view illustrating major components of a radiation cassette 170 according to a fifth embodiment of the present invention, and FIG. 12 shows a sectional view illustrating major components of the radiation cassette 170.

The radiation cassette 170 is provided with a shield plate 172 which is swingable with respect to a casing 14. A lock means 174, which fixes the shield plate 172 to the casing 14 and which is movable back and force in accordance with external force to make it possible to release the shield plate 172 from fixation, is provided on a side of a swingable forward end of the shield plate 172.

The lock means 174 comprises fixed hooks 176a, 176b which are fixed to both side portions of the casing 14, movable hooks 178a, 178b which are displaceable back and forth in the directions of the arrow A and which are engageable/disengageable with respect to the fixed hooks 176a, 176b, and lock release means 180 which are provided on the shield plate 172 and which are movable back and forth in the directions of the arrow A integrally with the movable hooks 178a, 178b.

The movable hooks 178a, 178b are disposed on the back surface side of the shield plate 172, and they are urged toward the fixed hooks 176a, 176b (in the direction of the arrow A2) by the aid of springs 182a, 182b. Slide knobs 184a, 184b, which constitute the lock release means 180, are secured to.the movable hooks 178a, 178b. The slide knobs 184a, 184b are arranged on the surface side of the shield plate 172.

In the radiation cassette 170 constructed as described above, when the shield plate 172 is opened with respect to the casing 14, the slide knobs 184a, 184b, which constitute the lock release means 180, are pressed in the direction of the arrow A1 against the springs 182a, 182b in a situation in which the locked state of the lid 16 effected by the lid lock means 46 is released. Accordingly, the movable hooks 178a, 178b, which are provided integrally with the slide knobs 184a, 184b, are disengaged from the fixed hooks 176a, 176b fixed to the casing 14. Thus, the shield plate 172 is released from the locked state effected by the lock means 180.

Subsequently, for example, after the cleaning operation is performed for the interior of the casing 14, the shield plate 172 is moved toward the casing 14 to make closure. During this process, the movable hooks 178a, 178b, which constitute the lock means 180, abut against the fixed hooks 176a, 176b, and they are once displaced in the direction of the arrow A1. After that, the movable hooks 178a, 178b protrude in the direction of the arrow A2 to make engagement with the fixed hooks 176a, 176b. Therefore, the shield plate 172 is fixed to the casing 14. Further, the lid 16 is moved toward the casing 14 to make closure. Thus, the lid 16 is locked to the casing 14 by the aid of the lid lock means 46.

As described above, in the fifth embodiment, the following effect is obtained. That is, the shield plate 172 can be attached and detached with respect to the casing 14. For example, the cleaning operation for the radiation cassette 170 is performed efficiently and easily.

Figure 13:
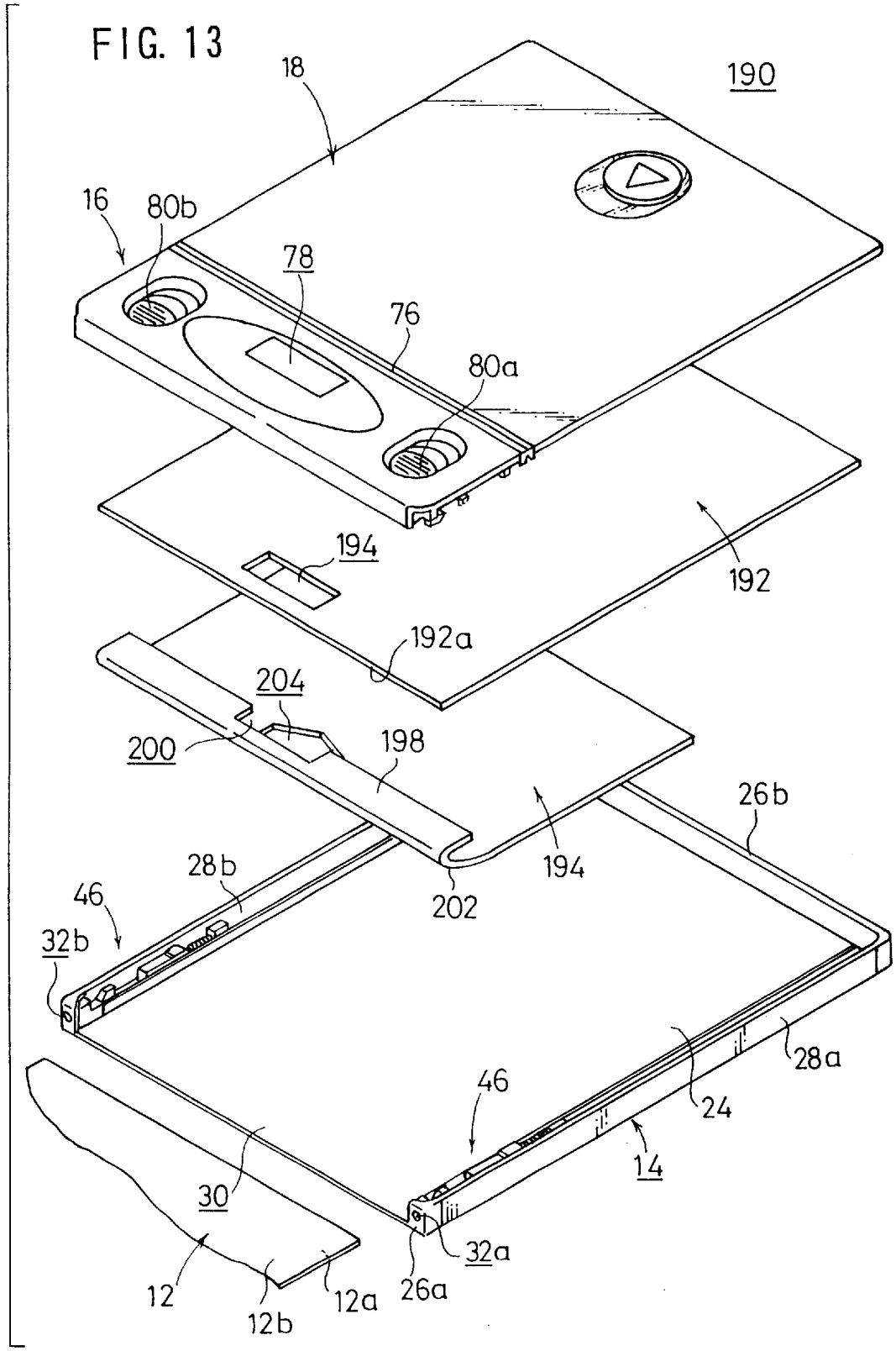
FIG. 13 shows an exploded perspective view illustrating a radiation cassette according to a sixth embodiment of the present invention.

FIG. 13 shows an exploded perspective view illustrating a radiation cassette 190 according to a sixth embodiment of the present invention. The same constitutive components as those of the radiation cassette 100 according to the second embodiment are designated by the same reference numerals, detailed explanation of which will be omitted.

The radiation cassette 190 comprises a casing 14 which accommodates an accumulative fluorescent material sheet (radiation image record carrier) 12, a lid 16 which is installed to a part of the casing 14 so that the lid 16 is openable and closable, a shield plate 18 which is arranged for a residual portion of the casing 14 and which holds the accumulative fluorescent material sheet 12 in a light-shielding manner together with the lid 16, a lead sheet 192 which is arranged in the casing 14 to cover the entire back surface 12b on a side opposite to a radioactive ray radiation surface 12a of the accumulative fluorescent material sheet 12 and which has a free end 192a extending on the side of the casing 16, and a guide sheet 194 which has a first end fixed on the side of the back surface 16a of the lid 16 and which has a second end interposed between the lead sheet 192 and the accumulative fluorescent material sheet 12 and arranged in the casing 14.

Figure 14:
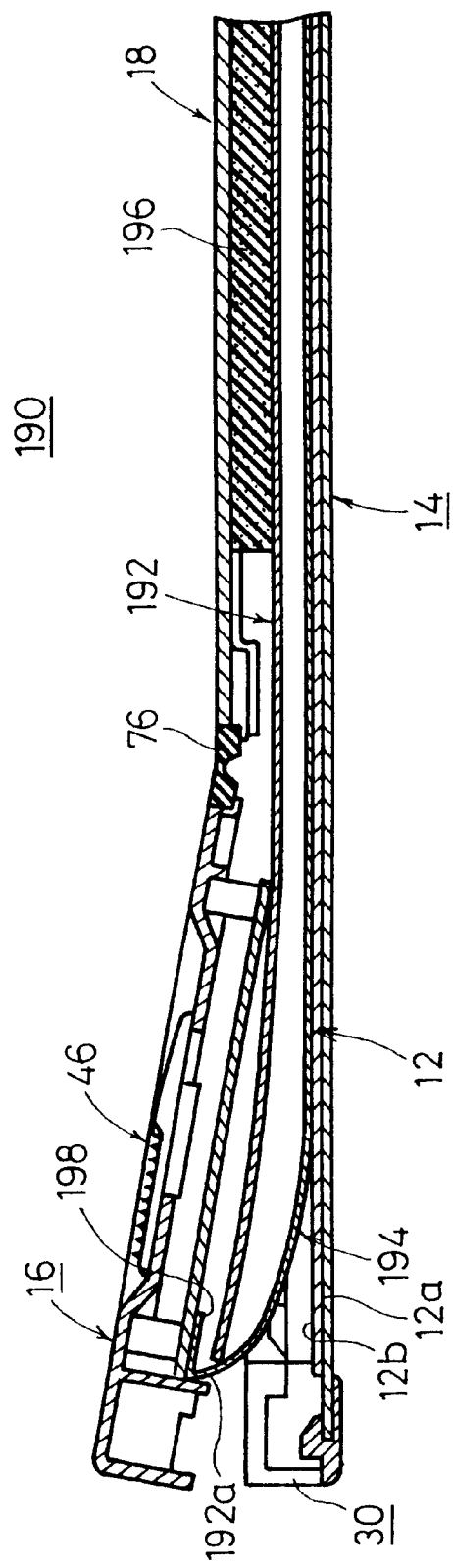
FIG. 14 shows a longitudinal sectional view illustrating a state in which a lid for constructing the radiation cassette is open.

As shown in FIGS. 13 and 14, an opening 204, which corresponds to the window 78 of the lid 16, is formed on the side of the free end 192a of the lead sheet 192. A sponge 196 is secured to the back surface side of the shield plate 18. The second end of the lead sheet 192 is secured to the sponge 196 or the bottom wall section 24 of the casing 14.

The guide sheet 194 is composed of a resin sheet, for example, a PP (polypropylene) sheet. A cutout 200, which corresponds to the window 78, is formed at the first end 198 which is secured to the back surface 16a of the lid 16. A buffering material 202 is stuck to the guide sheet 194. An opening 204, which corresponds to the window 78, is formed at a portion of the guide sheet 194 folded toward the casing 14.

Figure 15:
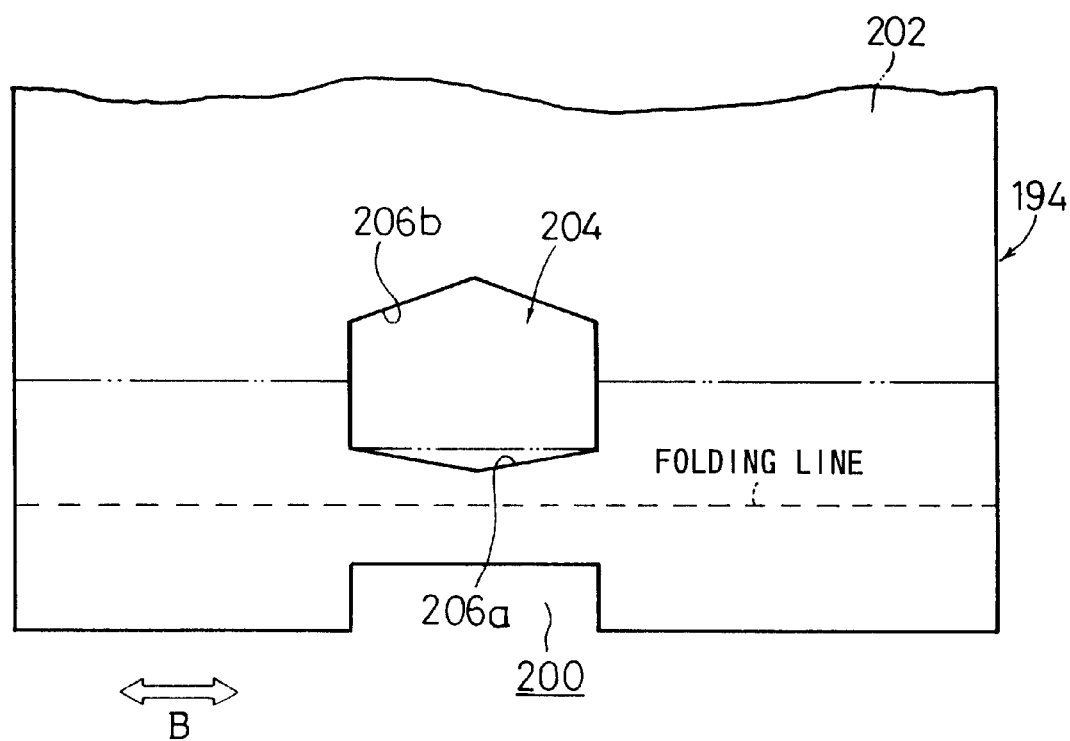
FIG. 15 illustrates, in a magnified manner, a part of a guide sheet for constructing the radiation cassette.

As shown in FIG. 15, two sides 206a, 206b of the opening 204 have tapered configurations which are bent in directions to make separation from each other in the same direction as the end surface direction (direction of the arrow B) of the free end 192a of the lead sheet 192. If there is no fear of being caught for the lead sheet 192, for example, it is unnecessary to design one of the sides 206b to have the tapered configuration. It is also possible that the respective sides 206a, 206b are designed to have curved configurations. The guide sheet 194 is designed to have a length with which it is possible to prevent the second end of the guide sheet 194 from protrusion from the inside of the casing 14 when the lid 16 is fully open.

Figure 16:
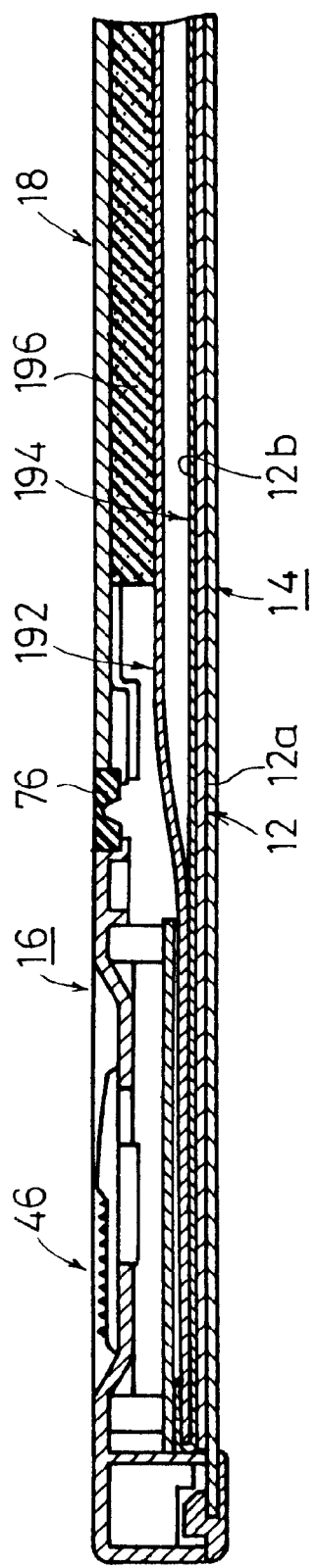
FIG. 16 shows a longitudinal sectional view illustrating a state in which the lid is closed.
Figure 17:
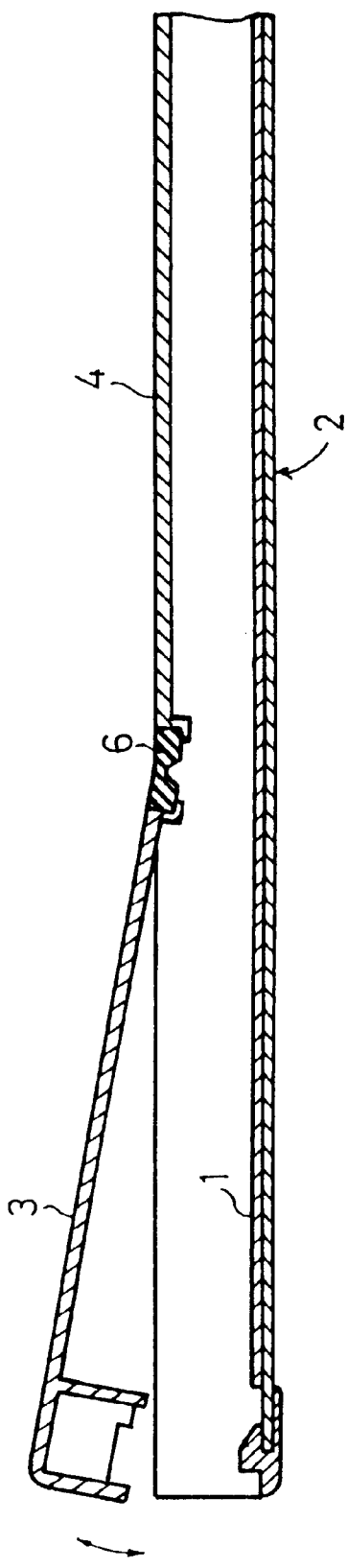
FIG. 17 shows a longitudinal sectional view illustrating a cassette concerning the conventional technique.
Figure 18:
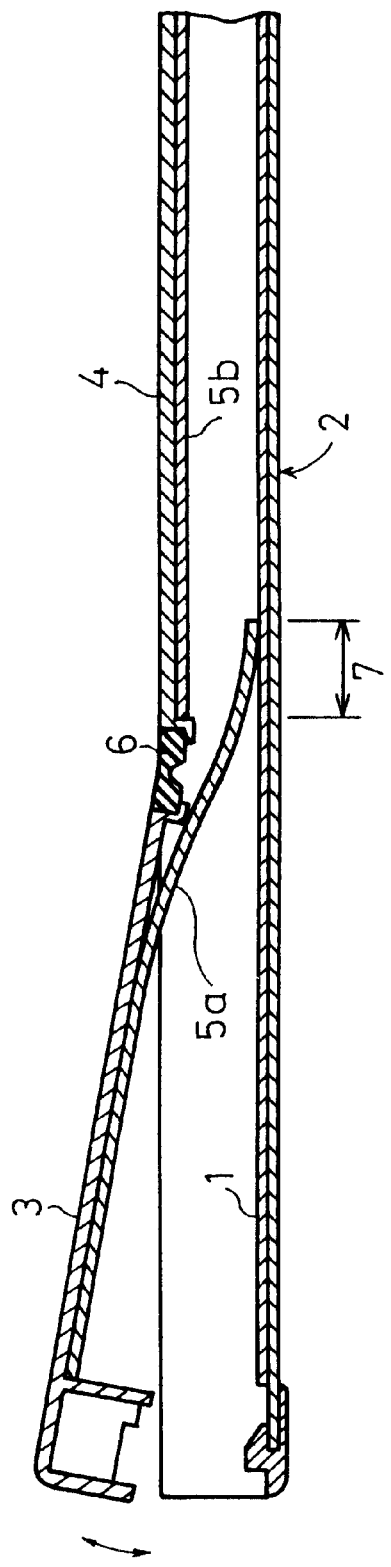
FIG. 18 shows a longitudinal sectional view illustrating the cassette concerning the conventional technique.

The arrangement of the radiation cassette 190 constructed as described above is shown in FIG. 16. That is, the lead sheet 192 is arranged to cover the entire back surface 12b on the side opposite to the radioactive ray radiation surface 12a of the accumulative fluorescent material sheet 12 in the radiation cassette 190. Accordingly, the nonuniformity of an image, which would be otherwise caused by scattered rays resulting from the thickness of lead, is not caused on the accumulative fluorescent material sheet 12. An effect is obtained such that it is possible to reliably perform the operation for recording the high quality radiation image information.

Further, in the sixth embodiment of the present invention, the lead sheet 192 has the free end 192a which extends on the side of the lid 16. The lead sheet 192 is not deformed integrally with the lid 16 when the lid 16 is opened and closed. Therefore, the lead sheet 192 is not folded or bent excessively when the lid 16 is opened and closed. An effect is obtained such that it is possible to effectively avoid the damage of the lead sheet 192.

The radiation cassette 190 is provided with the guide sheet 194 having the first end which is fixed to the back surface 16a of the lid 16. The guide sheet 194 is folded from the back surface 16a, and it is arranged in the casing 14 so that the free end 192a of the lead sheet 192 is covered therewith. Accordingly, as shown in FIG. 14, when the lid 16 is opened, the free end 192a of the lead sheet 192 is held by the guide sheet 194. It is possible to smoothly and reliably insert the accumulative fluorescent material sheet 12 from the opening 30 of the casing 14 into the casing 14.

The length of the guide sheet 194 is set so that the second end of the guide sheet 194 does not protrude toward the opening 30 when the lid 16 is fully open. Therefore, when the accumulative fluorescent material sheet 12 is inserted, the free end 192a of the lead sheet 192 does not obstruct the insertion of the accumulative fluorescent material sheet 12.

Further, the guide sheet 194 is provided with the opening 204 corresponding to the window 78 which is provided for the lid 16. The two sides 206a, 206b of the opening 204 are designed to have the curved or bent configurations in the same direction as the end surface direction of the free end 192a of the lead sheet 192. Accordingly, when the free end 192a of the lead sheet 192 is relatively displaced with respect to the opening 204 in accordance with the opening/closing operation of the lid 16, it is possible to effectively prevent the end surface of the free end 192a of the lead sheet 192 from being caught by the respective sides 206a, 206b.

When the free end 192a of the lead sheet 192 is subjected to an end surface treatment, it is possible to more reliably prevent the free end 192a from being fastened by the opening 204 of the guide sheet 194.

The first to sixth embodiments of the present invention have been explained based on the use of the accumulative fluorescent material sheet 12 as the radiation image record carrier. However, for example, it is also possible to use, as the radiation image record carrier, a photographic film for directly recording radiation image information of an object by radiating X-rays.

In the radiation cassette according to the present invention, the shield plate, which is swingably provided with the lid at the first end and which is supported detachably or swingably with respect to the casing, is provided with the lock means for releasing the locked state for the casing in the one-tough manner. The operation to release the fixation of the shield plate is performed easily for a short period of time all at once. Accordingly, for example, the cleaning operation for the interior of the casing is performed easily and efficiently, and the maintenance of the radiation cassette is effectively simplified.

In the radiation cassette according to the present invention, the lead sheet is provided to cover the entire back surface disposed on the side opposite to the radioactive ray radiation surface of the radiation image record carrier. The nonuniformity of the image, which would be otherwise caused resulting from the difference in thickness of lead, is not generated in the image information recorded on the radiation image record carrier. Further, the lead sheet has the free end extending on the side of the lid, and the guide sheet, which is fixed on the back surface side of the lid, is interposed between the lead sheet and the radiation image record carrier. Therefore, the lead sheet is not excessively folded or bent, and thus it is not damaged. Further, it is possible to insert the radiation image record carrier smoothly and reliably. Accordingly, the operation for inserting the radiation image record carrier is effectively performed with the simple arrangement. Further, it is possible to reliably record the high quality radiation image on the radiation image record carrier.

What is claimed is:

1. A radiation cassette comprising:
   a casing which accommodates a radiation image record carrier;
   a lid which is installed to a part of said casing so that said lid is openable and closable;
   a shield plate which is arranged for a residual portion of said casing and which is swingably provided with said lid at a first end;
   means for supporting a second end of said shield plate with respect to said casing; and
   means for fixing a first end of said shield plate to said casing and which slides back and forth in accordance with an external force so that said shield plate may be released from fixation.

2. The radiation cassette according to claim 1, wherein said support means is provided with a hinge for detachably supporting said shield plate with respect to said casing.

3. The radiation cassette according to claim 1, wherein said support means is provided with a hinge for swingably supporting said shield plate with respect to said casing.

4. The radiation cassette according to claim 1, wherein said lock means includes:
   upper hooks which are provided at both end edge portions in a widthwise direction of a back surface of said shield plate;
   lower hooks which are provided for said casing movably back and forth in a direction intersecting said widthwise direction and which are engageable with said upper hooks; and
   springs which press said lower hooks toward said upper hooks.

5. The radiation cassette according to claim 4, further comprising a lock release means which engages with said lock means and which is capable of releasing said shield plate from fixation by said lock means.

6. The radiation cassette according to claim 5, wherein said lock release means includes:
   lever members which are provided for said shield plate and which are movable back and forth in said direction intersecting said widthwise direction to make it possible to disengage said lower hooks from said upper hooks; and
   springs which press said lever members in directions to make separation from said lower hooks.

7. The radiation cassette according to claim 1, wherein said lock means includes:
   recesses which are formed at both end portions of said casing;
   lock members which are provided at both end edge portions in a widthwise direction of a back surface of said shield plate, which are movable back and forth in a direction intersecting said widthwise direction, and which are engageable with said recesses; and
   springs which press said lock members toward said recesses.

8. The radiation cassette according to claim 7, wherein said lock members are provided with lock release means with which said lock members are operable from a front surface side of said shield plate.

9. The radiation cassette according to claim 7, wherein lock release holes, into which lock release pins for inwardly pressing said lock members are insertable, are formed at side wall sections of said lid.

10. The radiation cassette according to claim 1, wherein said lock means includes:
    fixed hooks which are fixed to both side portions of said casing;
    movable hooks which are provided movably back and forth in directions perpendicular to a widthwise direction of said lid and which are engageable/disengageable with respect to said fixed hooks; and springs for pressing said movable hooks toward said fixed hooks.

11. The radiation cassette according to claim 10, wherein said movable hook is provided with a lock release means which makes it possible to operate said movable hook on a surface side of said shield plate.

12. The radiation cassette according to claim 1, further comprising a lid lock means for fixing said lid to said casing.

13. The radiation cassette according to claim 1, further comprising:

a lead sheet which is arranged in said casing to cover an entire back surface on a side opposite to a radioactive ray radiation surface of said radiation image record carrier and which has a free end extending at least on a side of said casing; and a guide sheet which has a first end fixed on a side of a back surface of said lid and which has a second end interposed between said lead sheet and said radiation image record carrier and arranged in said casing.

14. The radiation cassette according to claim 1, wherein said external force is applied in a direction which is along a surface of said shield plate.

15. The radiation cassette according to claim 1, wherein said means for fixing is non-rotatable.

16. A radiation cassette comprising:

a casing which accommodates a radiation image record carrier;

a lid which is installed to a part of said casing so that said lid is openable and closable;

a shield plate which is arranged for a residual portion of said casing and which holds said radiation image record carrier in a light-shielding manner together with said lid;

a lead sheet which is arranged in said casing to cover an entire back surface on a side opposite to a radioactive ray radiation surface of said radiation image record carrier and which has a free end extending at least on a side of said casing; and a guide sheet which has a first end fixed on a side of a back surface of said lid and which has a second end interposed between said lead sheet and said radiation image record carrier and arranged in said casing.

17. The radiation cassette according to claim 16, wherein:

said guide sheet has an opening corresponding to a bar code-reading window provided for said casing; and at least one side of said opening, which is disposed in the same direction as an end surface direction of said free end of said lead sheet, is designed to have a curved or bent configuration.

18. The radiation cassette according to claim 16, wherein said guide sheet is designed to have a length capable of preventing said second end of said guide sheet from protrusion from said casing when said lid is fully open.

19. The radiation cassette according to claim 18, wherein:

said guide sheet has an opening corresponding to a bar code-reading window provided for said casing; and at least one side of said opening, which is disposed in the same direction as an end surface direction of said free end of said lead sheet, is designed to have a curved or bent configuration.

20. A radiation cassette comprising:

a casing which accommodates a radiation image record carrier;

a lid which is installed to a part of said casing so that said lid is openable and closable;

a shield plate which is arranged for a residual portion of said casing and which is swingably provided with said lid at a first end;

a support member which supports a second end of said shield plate with respect to said casing; and a lock which fixes a first end of said shield plate to said casing and which is operable to slide back and forth in accordance with an external force so that said shield plate may be released from fixation.

21. The radiation cassette according to claim 20, wherein said external force is applied in a direction which is along a surface of said shield plate.

22. The radiation cassette according to claim 20, wherein said lock is non-rotatable.

\* \* \* \* \*